Patented Jan. 7, 1941

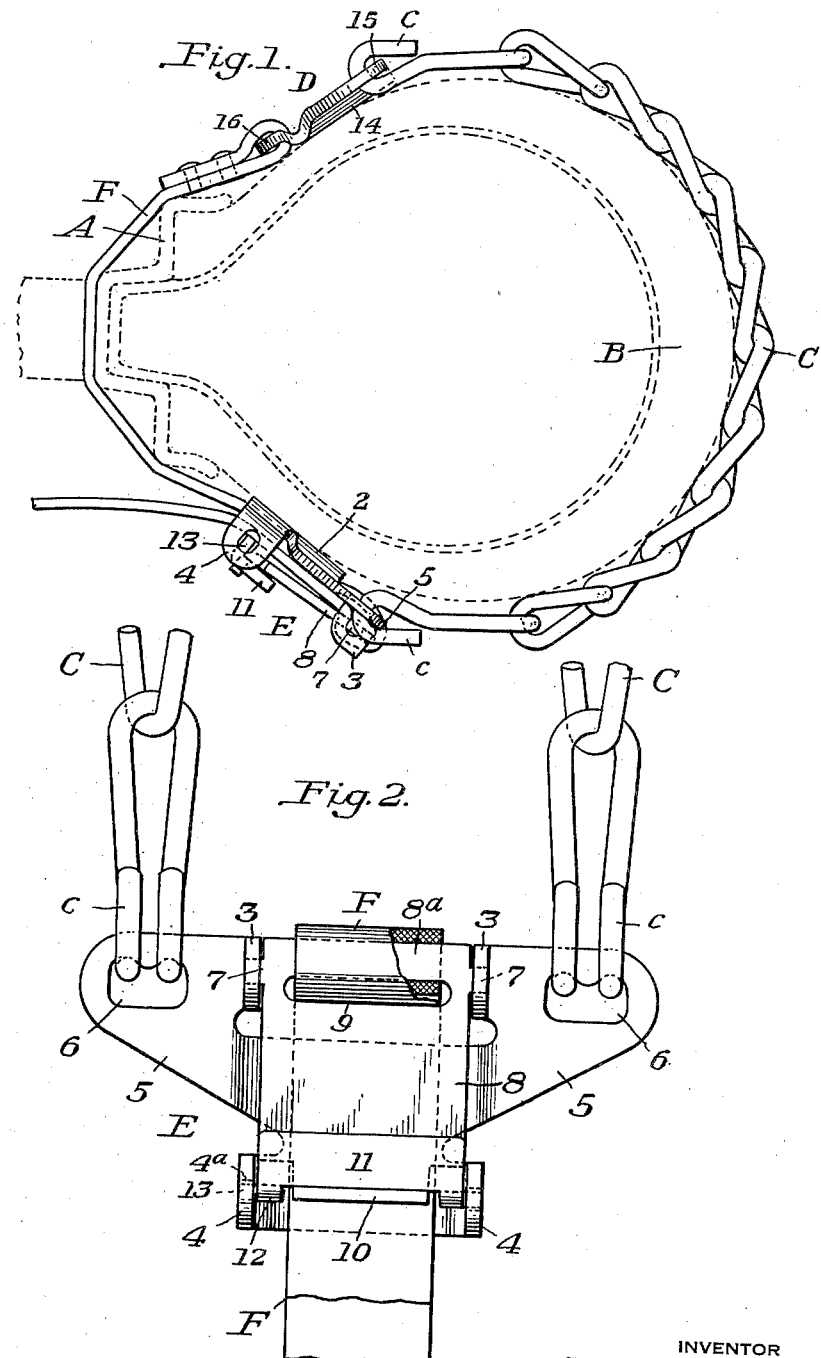

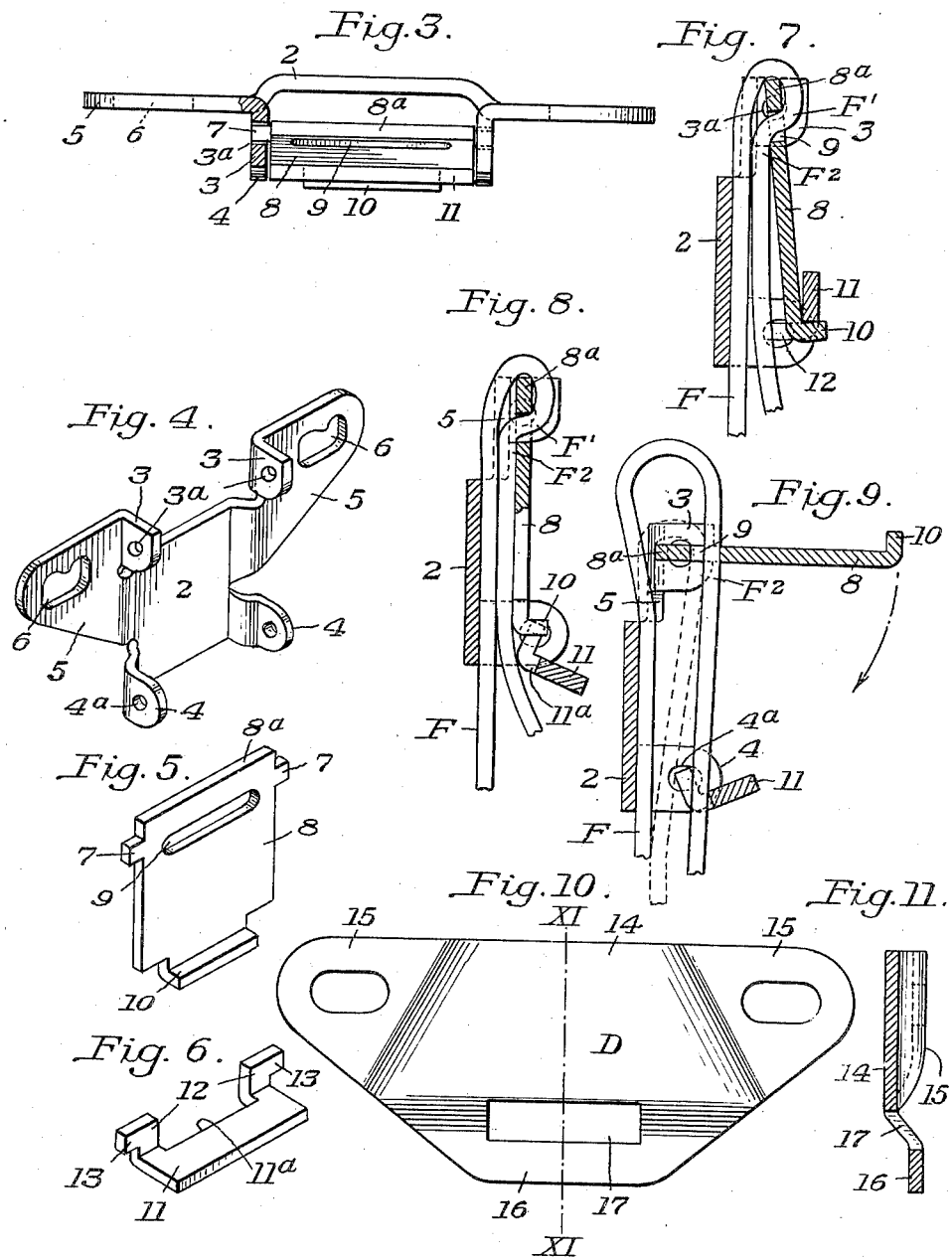

2,227,607

UNITED STATES PATENT OFFICE 2,227,607

BUCKLE

Albin Thomas, York, Pa., assignor to The McKay Company, Pittsburgh, Pa., a corporation of Pennsylvania Application November 1, 1939, Serial No. 302,341

6 Claims. (Cl. 24—193)

This invention is for an improvement in buckles and is for a buckle especially designed for use with emergency tire chain units but which is also applicable to other uses where a buckle of this general type may be used.

Since the buckle constituting my invention is primarily intended for use in connection with emergency tire chain units, it has been specifically shown in the accompanying drawings and will hereinafter be described in conjunction with an emergency tire chain, but it will be understood that this is not by way of limitation and that the invention is not specifically limited to a buckle for this purpose.

Emergency tire chain units usually comprise two side members, usually having two cross chains connecting them. A strap is permanently attached to one of these side members and the other side member carries a buckle through which the free end of the strap may be passed, the arrangement permitting the emergency tire chain unit to be applied to a vehicle wheel by merely placing the chains across the tread of the tire and passing the strap under the felly of the wheel and engaging it by the buckle, as is well known in the art. The emergency tire chain unit is applied to the tire so that the buckle is on the outer face of the wheel. If the buckle releases the strap during the operation of the vehicle, the unit will fall clear of the wheel and will usually be lost.

According to the present invention there is provided a buckle which is especially convenient for use on emergency tire chains and in other places where a strap has to be pulled quite tight and thereafter be held against slipping. The present invention provides a buckle which may be very conveniently used to enable the emergency tire chain unit to be applied to a vehicle wheel with as little trouble as possible and which will enable the strap and therefore the chains to be pulled very tight and kept tight. The buckle comprising the present invention is so constructed that after the strap has been pulled tight and the buckle has been finally closed the strap will not slip and cannot become accidentally released. As a matter of fact, the buckle is so constructed that the closing of the buckle slightly increases the tension on the strap to assure of the strap being pulled up tight.

The invention further provides a buckle of novel construction which is highly practical and which may be economically manufactured. The invention may be more fully understood by reference to the accompanying drawings in which Figure 1 represents a cross section through a tire and wheel showing an emergency chain unit with a buckle embodying my invention applied thereto;

Figure 2 is a front elevation of the buckle in closed position;

Figure 3 is an elevation showing the cross bar and buckle as viewed from the edge of the cross bar, the strap and the tire chains being omitted in this view;

Figure 4 is a perspective view of the cross piece forming the main body of the buckle with the pivoted tongue and the latch removed;

Figure 5 is a perspective view showing the pivoted tongue of the buckle detached from the rest of the structure;

Figure 6 is a perspective view showing the latch element detached from the buckle;

Figure 7 is a transverse vertical section through the buckle showing the strap therein and showing the parts in the position which they assume when the buckle is closed and latched;

Figure 8 is a view similar to Figure 7 but showing the position of the parts at the time the latch is released for opening the buckle and releasing the strap;

Figure 9 is a view similar to Figure 7 showing the buckle in a full open position and with the strap threaded therethrough;

Figure 10 is an elevation of a cross bar member to which the other end of the strap may be connected in an emergency tire chain unit; and Figure 11 is a transverse vertical section through the plate shown in Figure 10, the section being in the plane of line XI—XI of Figure 10.

Referring first to Figure 1, A designates the rim or felly of a vehicle wheel and B is a pneumatic tire. The emergency tire chain unit comprises cross chains C anchored at one end to a plate D and having their other ends attached to the buckle unit E. A flexible strap F has one end permanently attached to the plate D and has its other end releasably engaged by the buckle E.

The buckle unit E comprises the three parts shown in Figures 4, 5 and 6. The body of the buckle is provided by a plate 2, shown in Figure 4 which has a pair of upstanding ears 3 adjacent the upper edge thereof and which has a pair of upstanding ears 4 adjacent the lower edge thereof. The plate 2 is provided with laterally extending lugs 5 projecting from each side thereof, the lugs 5 being outwardly offset from the plane of the main portion 2 of the plate.

Each lug has a hole 6 therein. Hooks c on the ends of the emergency chains C pass through these holes 6. The purpose of offsetting the lugs 5 is to enable the plate 2 to lie adjacent the tire and provide clearance for the hooks between the buckle and the exterior of the tire. This member, constituting the body of the buckle, is so constructed that it may be integrally formed from a single piece of heavy sheet metal by combined stamping and pressing operations.

The ears 3 have openings 3a therethrough. These openings receive small lugs or trunnions 7 that project from each side edge of the tongue member 8 shown in Figure 5. The tongue member 8 is also preferably formed of a single piece of heavy sheet metal. It is generally flat and is provided with the extension 7 above referred to. It is formed with a slot 9 therein which slot is slightly out of line with the projections 7. At the free end of the tongue or lever 8 is an outwardly extending lip or projection 10 which extends outwardly in a direction normal to the plane of the tongue 8 and which is provided for cooperation with a latch element hereinafter described. When the buckle is assembled, the projections 7 engage in the openings 3a in the ears 3 providing a pivotal support for the tongue or lever 8 so that the outer end thereof may be swung in an arc toward and away from the plate 2.

The third part of the buckle which is a latch element is formed with a cross bar 11 having perpendicular arms 12 at each end thereof, the arms 12 in turn having laterally extending projections 13 thereon. These projections 13 engage in holes 4a in the ears 4 on the body of the buckle providing a pivotal support for the latch on the body of the buckle. There is a cut-out portion or notch 11a along the inner edge of the cross bar 11. The cross bar 11 of the latch being eccentric to the lugs 13 which provide the axis about which the latch rotates, the cross bar may be moved through an arc into and out of a position to engage the lip 10 on the tongue 8.

The general assembly of the buckle and the manner of using it may be readily seen by reference to Figures 1, 7, 8 and 9. When the emergency tire unit is applied to the tire, the end of the strap F is passed in the space between the latch 11 and the plate 2 as shown in Figure 9, the end of the strap passing under the inner edge portion 8a of the tongue of the buckle and over the face of the plate 2. The end of the strap is then folded to extend in the opposite direction and passed down through the slot 9 in the tongue 8, the tongue 8 at this time being swung out to a position where it is at right angles to the plane of the base 2, as clearly shown in Figure 9 and the free end of the strap is then passed in the reverse direction under the latch 11. The operator then pulls down on the free end of the strap so that the strap makes a close loop about the end portion 8a of the tongue as shown in Figure 9. Having thus pulled the strap tight, the operator pushes the tongue 8 toward the plate 2. This tends to kink the strap against the opposite edges of the slot 9, forming a relatively sharp kink in the strap as shown at F' in Figures 7 and 8. When the operator has closed the tongue down to a position where it is substantially parallel with the plane of the base 2, the latch 11 is swung from the position shown in Figures 8 and 9 to the position shown in Figure 7. In moving the latch over the tongue 10 the cross bar 11 aids in camming or forcing the tongue down to the position shown in Figure 8. The notch 11a in the latch 11 is so positioned that when the latch has been moved to the position shown in Figure 7 the tongue 10 may snap into and through the notch 11a. The tension on the strap and the kinking of the strap at F'' urges the tongue to swing outwardly from the position shown in Figure 7 so as to hold the tongue 10 engaged under the latch bar 11 as shown in Figure 7, and the greater the tendency of the tongue to swing out and release the strap the more firmly is the tongue engaged by the latch.

To release the buckle, the operator presses against the face of the tongue 8 with his thumbs, tending to release the pressure of the tongue against the latch 11 so that when the tongue has been swung in slightly to the position shown in Figure 8 the latch may be easily flipped back to a position where it clears the end of the tongue and the tongue may again swing freely out to the position shown in Figure 9. It should be noted that when the strap is passed through the slot 9 and is pulled down to a close loop as shown by dotted lines in Figure 9, the initial movement of the tongue 8 is in the direction of the arrow tending to kink the strap at F' and keep it from slipping through the slot 9. At the same time, the movement of the tongue 8 in the direction of the arrow tends to wrap the strap about the portion 8a of the tongue so that as the tongue is forced to the closed position, a tension is applied to the part of the strap marked $F^2$ in Figure 9 whereby the strap is actually pulled tighter as the buckle is closed. When the buckle is open and the tongue is swung in the reverse direction, the action of course is one of unwrapping the strap or unwinding the strap from about the parts 8a of the tongue which is desirable because it immediately throws a small amount of slack into the part of the strap that is looped over the top of the buckle and allows the operator to more easily release the strap because of the tension being thus partially relieved.

The invention thus provides a buckle formed of three parts which may be produced by relatively simple manufacturing operations. The buckle is convenient to use in that the operator merely has to pass the free end of the strap under the latch and under the inner end of the tongue, loop it about the free end of the tongue and through the slot in the tongue and then push it under the latch again and pull it tight. After the strap has thus been threaded through the buckle and pulled tight, the tongue is swung down to the closed position and latched. The moving of the tongue to the closed position kinks and binds the strap so that it cannot slip and in fact actually applies additional tension to the strap. While the tendency of the strap is to always open the buckle, the latch resists this opening of the buckle and the greater the tendency of the buckle to open the more effective is the latch. The operation of releasing the strap is easily and quickly accomplished by first pushing the tongue in a direction tending to increase the binding action to thereby relieve pressure on the latch and then swinging the latch to clear the tongue and releasing the tongue. The buckle is most effective when the strap is of a thickness closely approaching the thickness of the slot 9 in the tongue. Because the strap is nearly as thick as the width of the slot 9, the strap is more effectively kinked at F' and the corners of the slot more effectively engage the strap to prevent slippage. The ears 3 and the lugs 7 providing the pivotal support for the tongue are preferably so positioned that when the tongue is in a position perpendicular to the plate 2, a single thickness of the strap may easily be passed over the plate 2 and under the edge portion 3a of the tongue as shown in Figure 9 without any sharp bending of the strap. The latch 11 is supported by the ears 4 at a distance out from the surface of the plate 2 sufficient to enable two thicknesses of the strap to easily pass under the latch and under the tongue when the tongue is closed.

The plate D shown in elevation in Figure 10 has a central portion 14 and two lug portions 15, the portion 14 being pressed inwardly from the plane of the lugs 15 in relation to the side of the tire so that the part 14 may lay against the surface of the tire while the lugs 15 are spaced outwardly from the tire and provide clearance for the hooks at the opposite end of the cross chain. One edge portion 16 of the plate is also pressed outwardly from the plane of the plate in the same manner that the lugs are pressed outwardly and there is a slot 17 in the plate between the portion 16 and the part 14. One end of the strap F passes through this slot and is riveted over upon itself to permanently attach one end of the strap to the plate. The purpose of offsetting the part 16 of course is to provide clearance for the strap between the metal plate and the tire.

While I have illustrated and described one particular embodiment of my invention, it will be understood that various changes and modifications may be made as contemplated therein and within the scope of the following claims and that the buckle, while primarily applicable for emergency tire chains, is also useful for other purposes.

I claim:

1. A buckle of the class described comprising a body member having a flat plate portion, a tongue member pivotally supported on the body member and spaced outwardly from the plane of said plate portion a sufficient distance to permit a strap to pass therebetween and movable in an arc from a position substantially perpendicular to the plate portion to a position where it overlies the plate portion, and a latch member pivotally carried on said body and spaced outwardly from said flat plate portion sufficiently to permit a strap to pass therebetween, said latch member being movable about its axis from a position where it extends over said tongue member and restrains said tongue member from movement in a direction outwardly from the plate portion to a position where it is clear of said tongue member, the tongue member having a strap-receiving slot therethrough near the point of its pivotal support on the body, whereby the strap passing between the body member and the tongue member may be passed outwardly around a portion of the tongue and in the reverse direction through the space between the body and tongue members.

2. A buckle of the class described comprising a body member having a flat plate portion, a tongue member pivotally supported on the body member and spaced outwardly from the plane of said plate portion a sufficient distance to permit a strap to pass therebetween and movable in an arc from a position substantially perpendicular to the plate portion to a position where it overlies the plate portion, and a latch member pivotally carried on said body and spaced outwardly from said flat plate portion sufficiently to permit a strap to pass therebetween, said latch member being movable about its axis from a position where it extends over said tongue member and restrains said tongue member from movement in a direction outwardly from the plate portion 5 to a position where it is clear of said tongue member, the tongue member having a strap-receiving slot therethrough near the point of its pivotal support on the body, whereby the strap passing between the body member and the tongue member may be passed outwardly around a portion of the tongue and in the reverse direction through the space between the body member and the tongue, the tongue member having a lip projecting therefrom and the latch element having a notch therein to receive said lip.

3. A buckle of the class described comprising a body member having a flat plate portion, a tongue member pivotally supported on the body member and spaced outwardly from the plane of said plate portion a sufficient distance to permit a double thickness of strap to pass therebetween and movable in an arc from a position substantially perpendicular to the plate portion to a position where it overlies the plate portion, and a latch member pivotally carried on said body and spaced outwardly from said flat plate portion a sufficient distance to permit a strap to pass therebetween, said latch member being movable about its axis from a position where it extends over said tongue member and restrains said tongue member from movement in a direction outwardly from the plate portion to a position where it is clear of said tongue member, the tongue member having a strap-receiving slot therethrough near the point of its pivotal support on the body whereby the strap passing between the body and tongue members may be passed outwardly around a portion of the tongue and doubled back on itself between the body and tongue members, said body member having laterally extending lugs thereon which are forwardly offset from the plane of said flat portion and to which chains may be attached.

4. A buckle comprising a body member, a tongue member pivotally supported on the body member and movable about its pivot from a position where it overlies the body member to a position where it is generally perpendicular to the body member, said tongue having a slot therethrough through which a strap to be buckled may pass, the slot serving to sharply kink the strap which passes through the slot, and means carried by the body and cooperating with the tongue member for releasably holding the tongue member in a position where it overlies the body.

5. A fastening means comprising a buckle and a strap, the buckle having a body portion across which the strap extends, a tongue member pivotally supported adjacent one end on the body portion and movable from a plane parallel to the body portion to a plane perpendicular thereto, said tongue having a slot therethrough adjacent the pivoted end thereof, the strap passing around the pivoted end of the tongue and through the slot from the outer face of the tongue to the space between the tongue and the body, and latch means carried by the body and cooperating with the tongue for releasably holding the tongue from swinging in a direction outwardly from the body.

6. A fastening means comprising a buckle member having a body portion, a tongue element pivotally supported adjacent one end thereof on the body portion so as to swing in an arc toward and away from the body portion, said tongue having a strap-receiving slot therein adjacent the pivoted end thereof, a latch element extending transversely across the body portion and pivotally supported on the body portion for movement in an arc from a position to project over the free end of said tongue to a position where it is clear of the free end of said tongue, and a strap passing over said body portion and folded about the pivoted end of said tongue and passing through said slot and extending under said tongue toward the latch.

ALBIN THOMAS.